May 13, 1958 W. C. HOLLANDER 2,834,571
VALVES WITH WEDGING VALVE ELEMENTS
Filed June 24, 1955 5 Sheets-Sheet 1

*INVENTOR.*
WALTER C. HOLLANDER
By his attorney
John F C Glenn

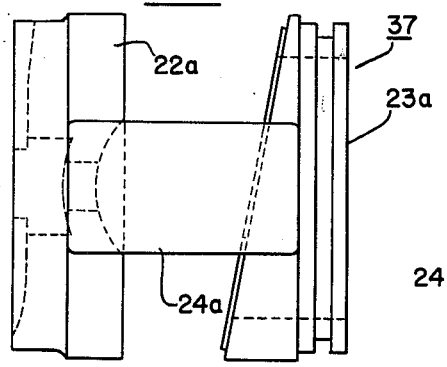
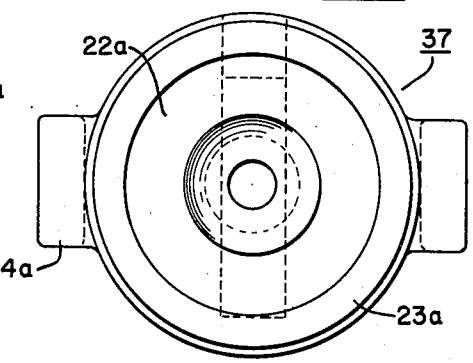
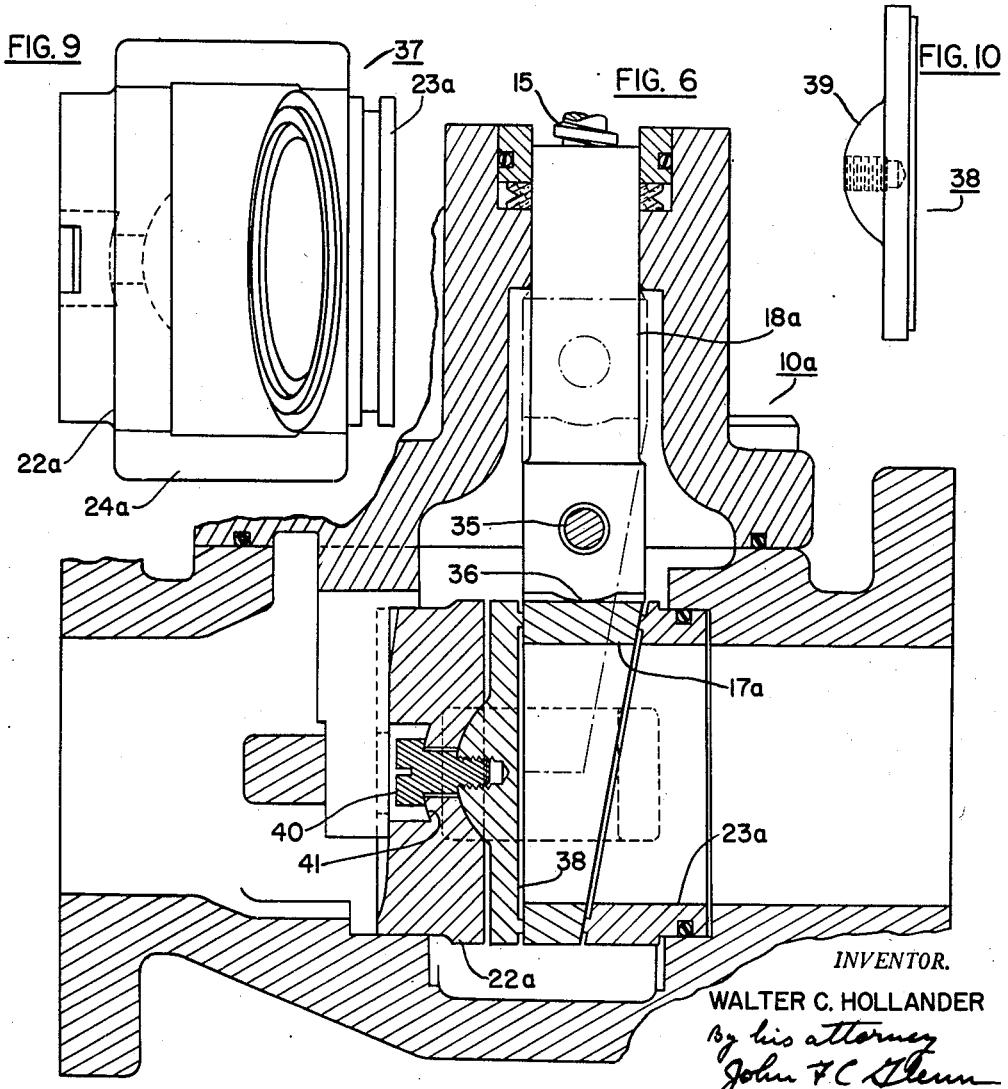

May 13, 1958     W. C. HOLLANDER     2,834,571
VALVES WITH WEDGING VALVE ELEMENTS

Filed June 24, 1955     5 Sheets-Sheet 4

INVENTOR.
WALTER C. HOLLANDER
By his attorney
John F C Glenn

May 13, 1958 W. C. HOLLANDER 2,834,571
VALVES WITH WEDGING VALVE ELEMENTS
Filed June 24, 1955 5 Sheets-Sheet 5
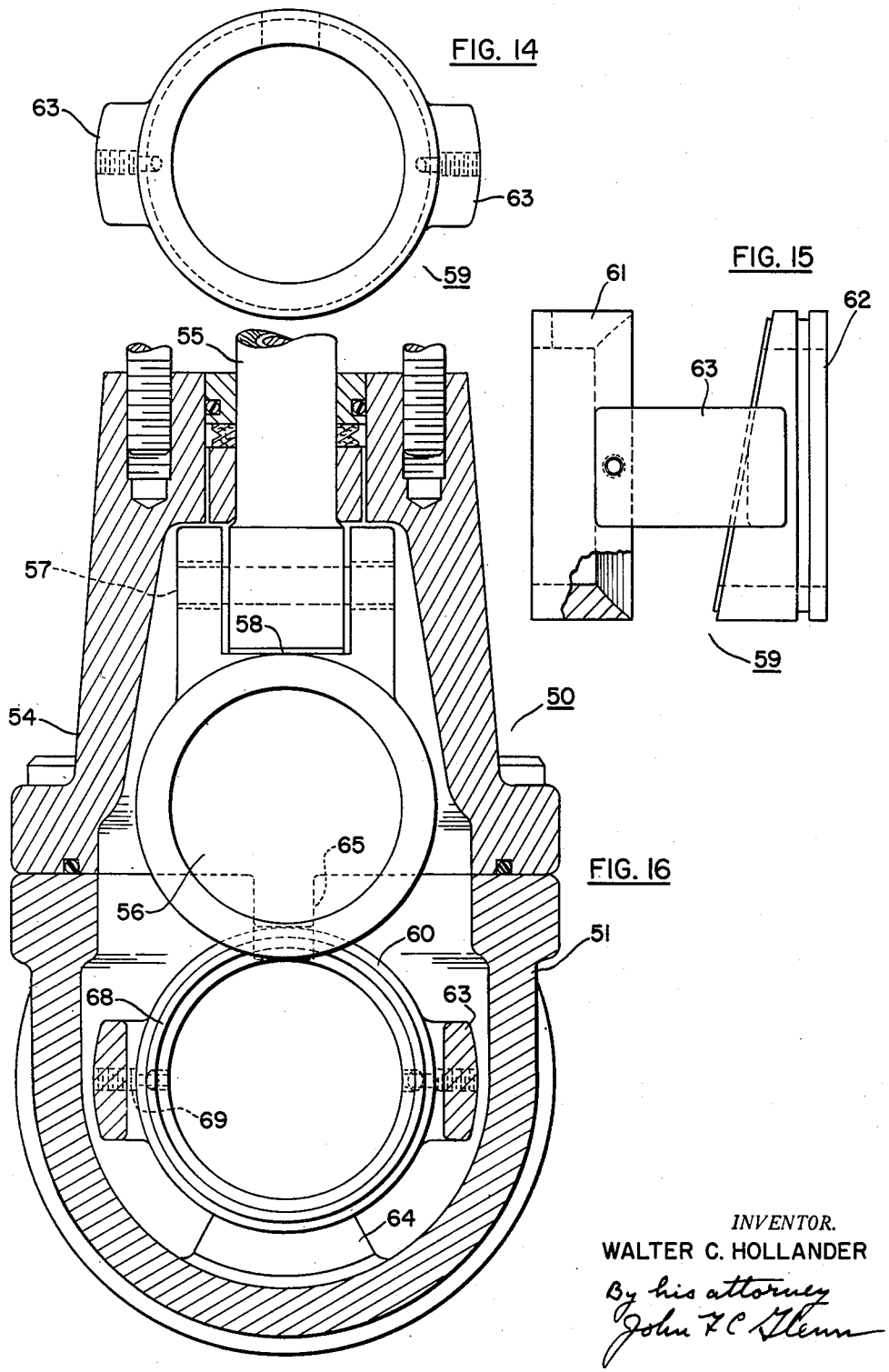
INVENTOR.
WALTER C. HOLLANDER

United States Patent Office 2,834,571
Patented May 13, 1958

2,834,571

VALVES WITH WEDGING VALVE ELEMENTS

Walter C. Hollander, Buckingham County, Va.

Application June 24, 1955, Serial No. 517,689

22 Claims. (Cl. 251—195)

This invention relates to valves having valve elements which wedge tightly between a pair of opposite valve seats when in closed position, as, for example, in the case of ring- and solid-type gate valves.

The major problem in such valves is to assure a leakproof fit between the valve element and valve seat, without developing seating pressures so high as to risk sticking the valve when closed or cracking the valve structure during the tightening process. It is also necessary to take into account thermal expansion and contraction of the valve components, which are frequently of different materials, and may be subject to varying local temperatures. One approach to this problem is to use rubberlike materials as backing elements, but this is not a satisfactory solution because, among other reasons, the resilient characteristics of such rubber-like materials are apt to change significantly in the course of continued operation.

In accordance with the present invention the movable valve member and valve seat structure are both all-metal, but are so constructed that the valve member is received by the valve seat with sufficient resiliency to provide a tight and accurate metal-to-metal fit without excessive pressure or strain, and without requiring the very close manufacturing tolerances conventionally required for high pressure, all-metal valves. The valve seat structure is in the form of a removable insert so mounted that it accommodates itself to seat the movable valve member, without reliance on any resiliency of the main valve body. The valve seat structure is readily assembled and replaced in the valve, and is adaptable for use with both solid and ring-type valve elements.

Other objects and novel features and advantages of the invention will become apparent from the following detailed description of present preferred embodiments of the invention illustrated in the accompanying drawings. In the drawings:

Figure 6 is a partially broken-away section of a modified form of ring-type gate valve embodying the invention, taken through the intersecting axes of the valve stem and of the fluid passageway through the valve body, the valve being shown in closed position;

Figures 7, 8 and 9 are side, end and top elevations of the valve seat insert for the valve shown in Figure 6, with the auxiliary valve seating disc removed;

Figure 10 is the auxiliary valve seating disk for the valve and valve seat insert shown in Figures 6–9;

Figures 12, 14 and 15 are top, end and side elevations of the valve seat insert for the valve shown in Figure 11, with the auxiliary valve seating ring removed;

Figure 16 is a section of the valve shown in Figure 11, taken through the valve stem axis normal to the axis of the fluid passageway through the valve body, the valve being shown in open position.

Figure 1:
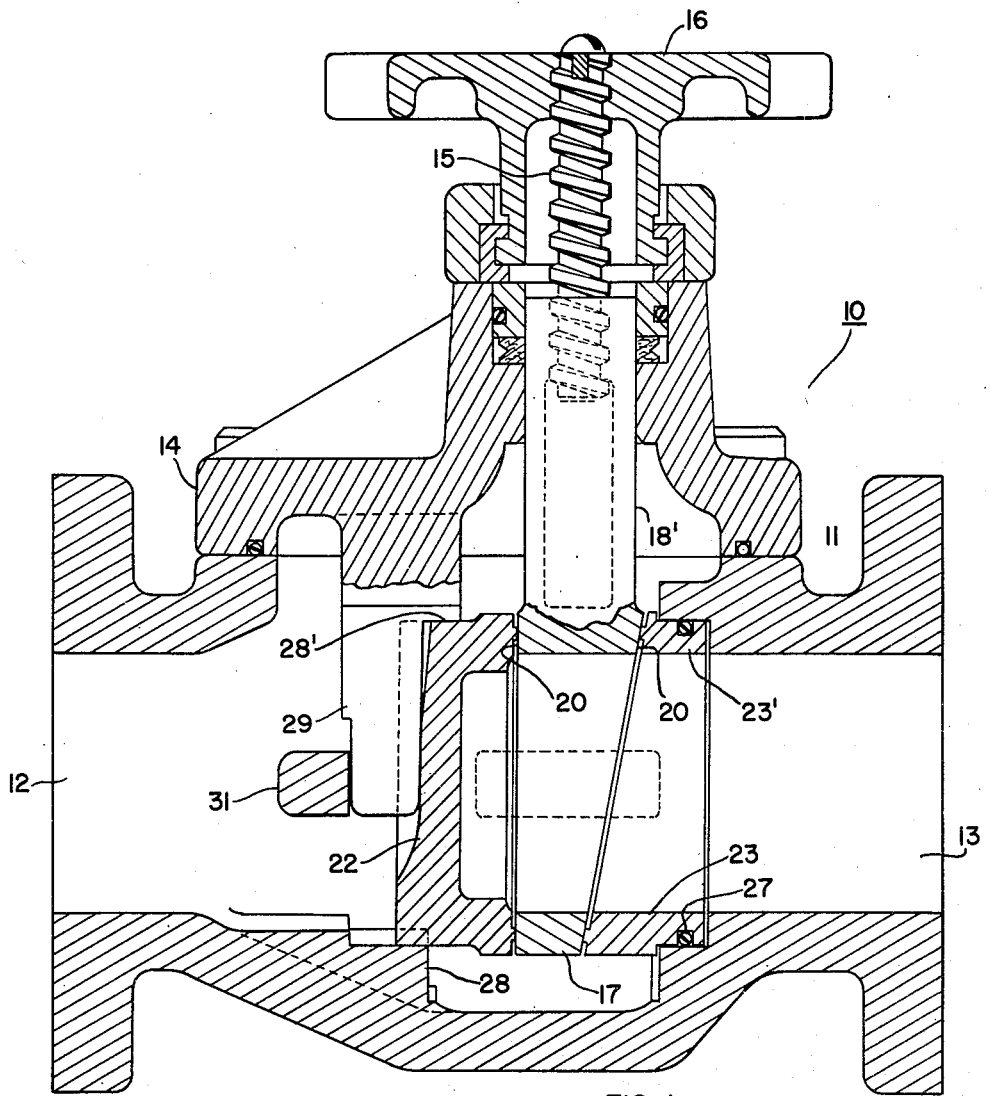
Figure 1 is a section of a ring-type gate valve embodying the invention, taken through the intersecting axes of its valve stem and of the fluid passageway through the valve body, the valve being shown in closed position.
Figure 2:
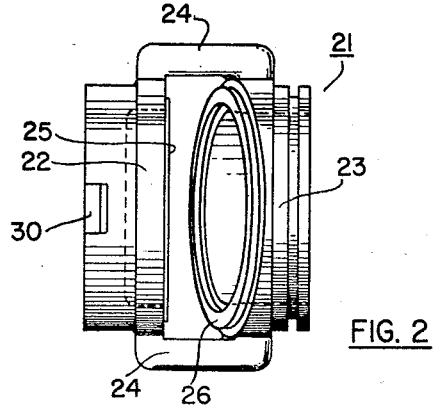
Figures 2, 3 and 4 are top, side and end elevations of the valve seat insert for the valve shown in Figure 1.
Figure 3:
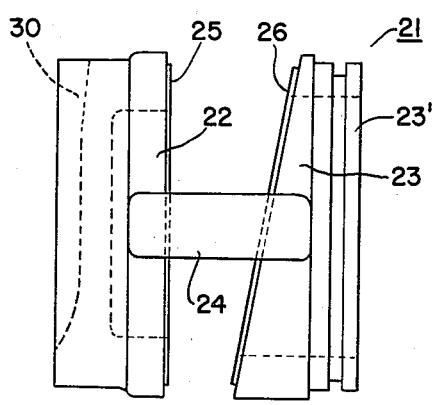
Figure 4:
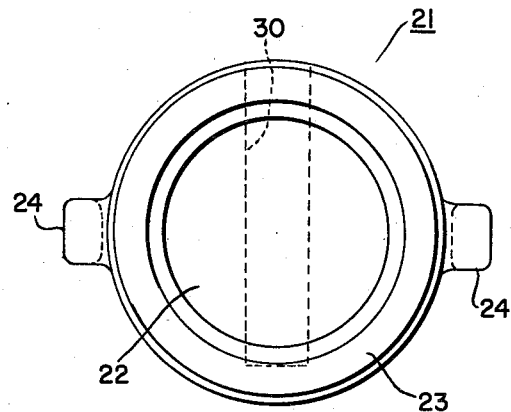
Figure 5:
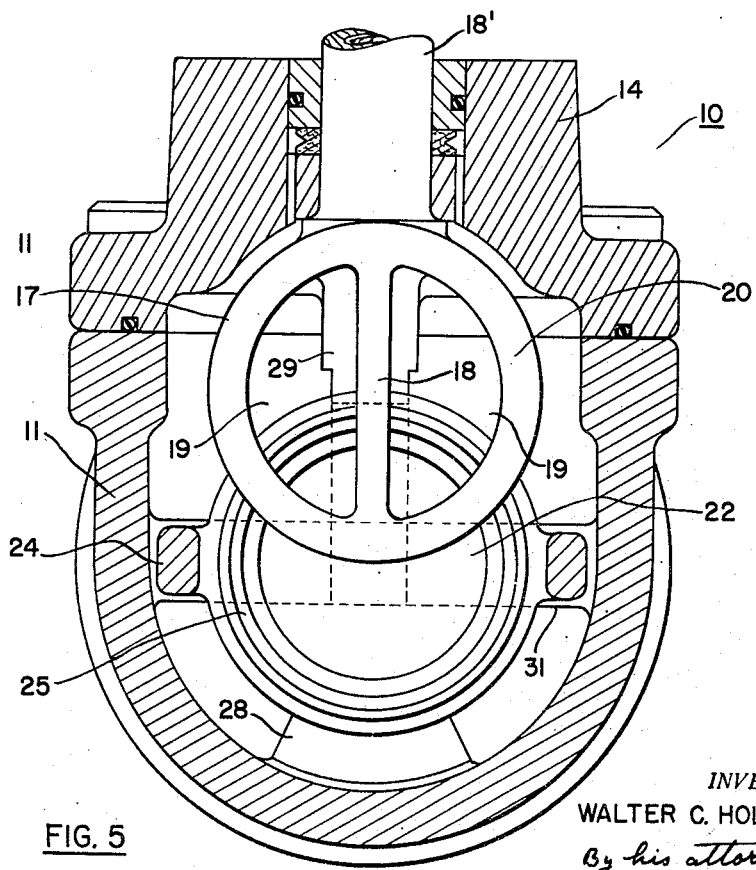
Figure 5 is a section of the valve shown in Figure 1, taken through the stem axis normal to the axis of the fluid passageway through the valve body, the valve being shown in open position.
Figure 12:
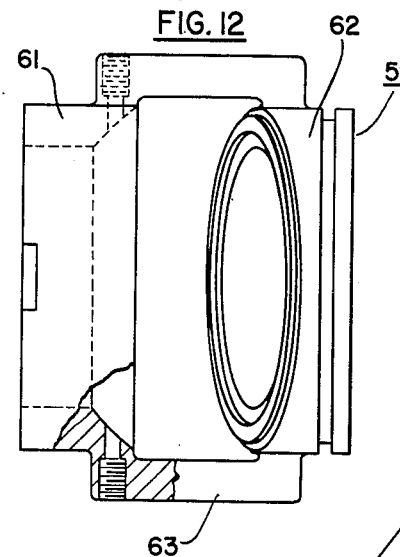
Figure 13:
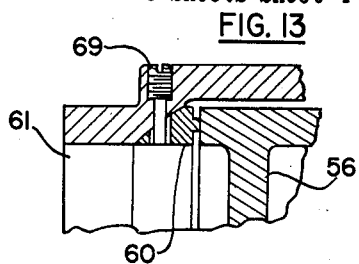
Figure 13 is an enlarged section of adjacent parts of the insert, auxiliary ring and gate, and of the pin connecting the insert and auxiliary ring.
Figure 11:
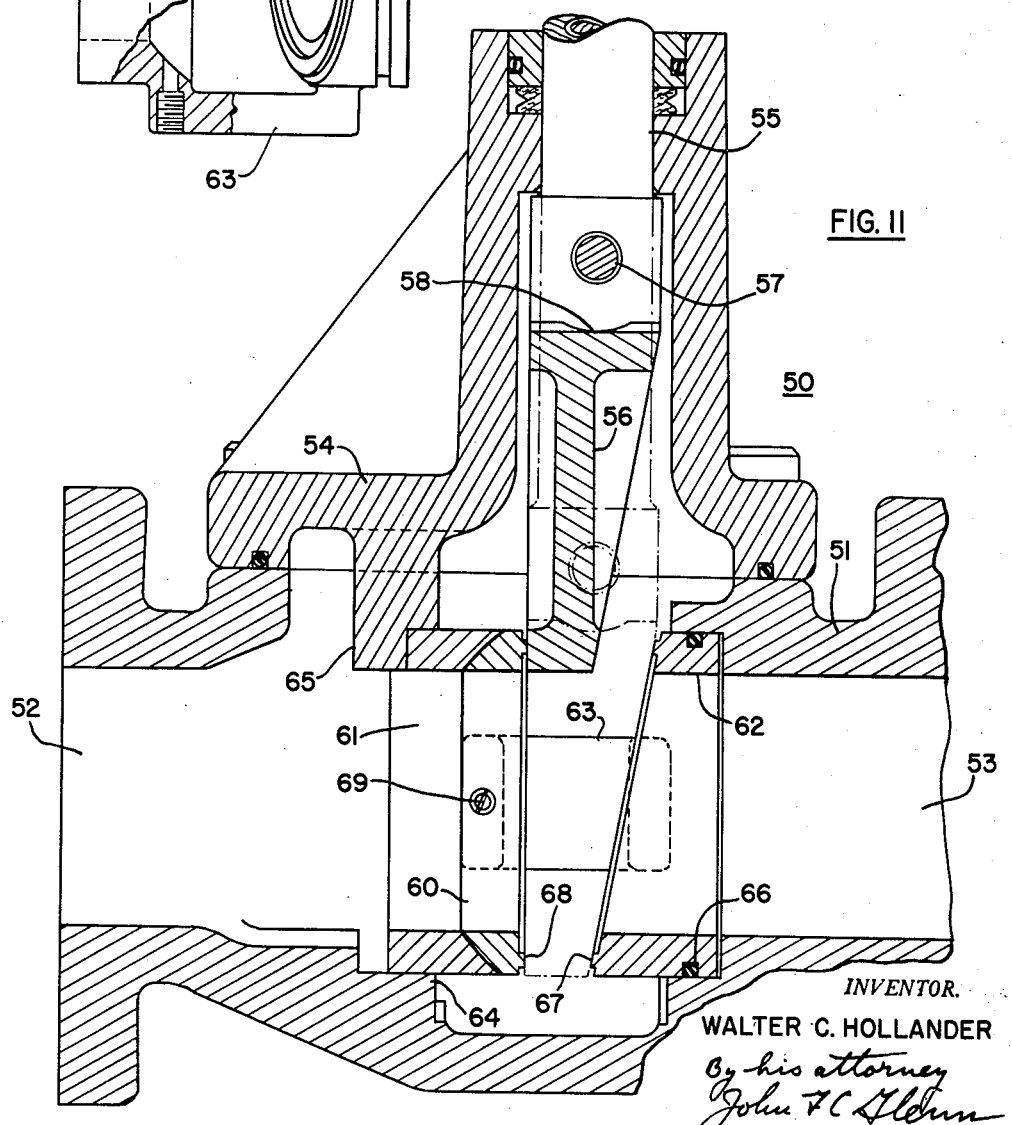
Figure 11 is a further modified form of solid-type gate valve embodying the invention, taken through the intersecting axes of the valve stem and of the fluid passageway through the valve body, the valve being shown in closed position.

Referring now more particularly to the drawings, and initially to Figures 1–5, the valve 10 has a body or case 11 with a pair of opposite ports 12 and 13, and a bonnet 14 bolted on top. The bonnet 14 journals a handle 16 secured to a screw 15 for operating a gate valve member 17 in the body 11. The valve member 17 is ring-shaped and has an integral bracing member 18 which extends across the middle of the ring and splits the opening therethrough into two passages 19 (Figure 5). A stem 18' extends integrally above the valve member 17 and has a threaded opening which receives the screw 15 for purposes of raising and lowering the valve member 17 when the screw 15 is rotated one way or the other. The valve member 17 has a pair of opposite faces 20 which are finished to lie in planes converging toward the bottom of the valve so that the valve member wedges into its closed position.

An integral metal valve-seating unit 21 is mounted in the body 11 to seat the valve member 17 in its closed position. The seating unit 21 comprises a solid disk 22 spaced from a ring 23 and connected thereto by a pair of integral arms 24, one extending from one side of disk 22 to the adjacent side of ring 23, and the other extending between the corresponding opposite sides of disk 22 and ring 23. The opposite faces of the disk 22 and ring 23 have integral annular lips 25 and 26, respectively, with annular seating surfaces finished to lie in planes inclined to each other at the same angle as the angle between the opposite faces 20 of the valve member 17.

The seating unit 21 is mounted in the valve as follows: The ring 23 has an extension 23' of reduced diameter fitting slidably into a counterbore in the valve body 11 at the inner end of port 13. A groove around the extension 23' receives an O-ring 27 which seals the connection between extension 23' and valve body 11. The bottom of disk 22 rests on a ledge 28 formed in valve body 11, and the top of disk 22 is restrained against upward movement by an over-lapping ledge 28' of an integral tongue 29 extending down from the valve bonnet 14. The lower portion of the tongue 29 extends slidably between a generally vertical groove 30 down the back of disk 22, and an integral crossweb 31 formed in the valve body 11. The tongue 29 bears against the back of disk 22 at the base of groove 30 at the level of the arms 24, but the groove 30 is curved away from tongue 29 above such level, in order to support disk 22 and ring 23 against the wedging action of valve member 17 while also allowing a sufficient degree of angular adjustment of disk 22 and ring 23 relative to each other, through bending of arms 24, to press lips 25 and 26 into an accurate and tight fit against the faces 20 of valve member 17 as it wedges into closed position. Tongue 29 furnishes support against the wedging action of the valve member 17, and also against fluid pressures tending to displace seating unit 21 from its seat in the valve body. The disk 22 fits sufficiently loosely between the ledges 28 and 28', and the ring extension 23' fits sufficiently loosely into valve body 11, to accommodate angular adjustment of both disk 22 and ring 23. When seating unit 21 is to be removed for repair or replacement, valve bonnet 14 is removed from valve body 11, thereby withdrawing tongue 29 from between disk 22 and crossweb 31, and then seating unit 21 is shifted away from port 13 to disengage ring extension 23' from valve body 11, after which unit 21 is lifted out of valve body 11 through the opening uncovered by removal of valve bonnet 14. The parts are readily reassembled by reversal of the same procedure.

When valve member 17 is in its closed position, its opposite annular faces 20 are wedged into full metal-to-metal surface contact with the opposite lips 25 and 26 of the seating unit 21, and fluid in port 13 cannot escape from the interior of unit 21 into the valve chamber connected to port 12, or vice versa. When handle 16 is operated to lift valve member 17 a distance equal to about one-half of the diameter of its annular faces 20, fluid can pass through the resultant gap between disk 22 and ring 23 to allow flow between ports 12 and 13. It will be observed that when port 13 is on the high pressure side of the valve, the wedge shape of valve member 17, with the thicker portion at the top, results in a net pressure differential tending to lift valve member 17 upwardly, which facilitates opening the valve. This easier-opening effect is enhanced by the fact that the ring shape of the valve member 17 avoids any increase of frictional forces holding the valve member against the valve seat as a result of fluid pressures.

A modified form of ring-type gate valve 10a is shown in Figures 6–10. The body 11, bonnet 14, and operating screw 15 are the same as in the case of valve 10 shown in Figures 1 and 5, but the valve member 17a is made with the closure ring portion pivotally connected to its stem 18a by a pin 35. The lower end of stem 18a has a cylindrical projection 36 concentric with pin 35 and abutting a flat horizontal surface at the top of the closure ring portion of valve member 17a in order to transmit downward pressure from stem 18a without imposing the resultant load on pin 35. The seating assembly is also different, and consists of an integral metal seating unit 37 with a non-integral auxiliary seating disk 38. The seating unit 37 comprises a disk 22a spaced from a seating ring 23a by a pair of arms 24a. The arms 24a are similar to the above described arms 24 except that the arms 24a are heavier because they are not intended to be flexed to any significant degree. The disk 22a and ring 23a are mounted in the valve in the same manner as the above-described disk 22 and the ring 23 of Figures 1 and 5, except that the disk 22a and ring 23a are preferably fitted snugly in the case without allowance for any relative movement between them during operation of the valve. The auxiliary seating member 38 has a semi-spherical knob 39 slidably received in a corresponding depression in the adjacent front face of disk 22a. A screw 40 is threaded into knob 39, with the screw shank extending loosely through an opening from said depression to the opposite rear face of disk 22a, and with the screw head in slidable engagement with a semi-spherical surface 41 formed on the rear face of the disk 22a around said opening and concentric with said depression. The auxiliary seating member 38 is thus held against the supporting disk 22a but is free to change its angle in any direction relative to disk 22a.

The valve member 17a is closed by wedging it down between the adjacent front face of seating ring 23a, and the adjacent front face of the auxiliary seating member 38. During such closing movement the pivot pin 35 and cylindrical abutment 36 permit angular adjustment of the valve member 17a so that it adjusts itself to fit accurately and tightly against the seating ring 23a, and the knob 39 allows angular adjustment of the auxiliary member 38 so that it adjusts itself to fit accurately and tightly against the valve member 17a. While the valve member 17a is in its closed position fluid from the port 13 is trapped in the closed chamber formed by the auxiliary member 38, valve member 17a and ring 23a. When the valve member 17a is lifted fluid can flow to and from port 13 through the gap between auxiliary member 38 and ring 23a.

The above-described ring-type valve members have the advantage of eliminating fluid pressures tending to increase friction between the seating faces, so that it is easier to open and close the valve. However, the invention is also applicable to other forms of valves, such as those having a solid gate, which has the advantage of providing an unobstructed fluid passageway through the gate when the valve is opened, so that cleaning devices can be passed down the bore of the valve and the conduit to which it is connected.

The solid-gate type valve 50 illustrated in Figures 11–16, for example, has a body 51 with opposite ports 52 and 53 connected by a straight and unobstructed passageway therebetween when the valve is open. A bonnet 54 is bolted on the body 51 and its upper end mounts screw means (not shown) for raising and lowering a valve stem 55. The stem 55 operates a valve gate 56 by a connecting pin 57 and a cylindrical abutting shoulder 58 corresponding to the above-described pin 35 and shoulder 36 shown in Figure 6. The gate 56 is a solid disk, but otherwise is the same as the valve element 17a shown in Figure 6. The valve seating assembly comprises an integral metal seating unit 59, and a non-integral auxiliary seating ring 60. The seating unit 59 is in the form of a pair of parallel spaced rings 61 and 62 integrally connected by a pair of arms 63 (like the arms 24a shown in Figures 6–10). The bottom of ring 61 rests on a ledge 64 formed in the valve body 51, and the top of ring 61 is held down and also supported against movement toward the adjacent port 12 by integral tongue 65 extending down from the bonnet 54. Ring 62 has one end extending slidably into a counter-bore in valve body 51, with an O-ring seal 66 in a groove around ring 62 to seal the connection between ring 62 and the said counter-bore. The other end of ring 62 has an annular lip 67 which seats one of the faces of gate 56 when it is in closed position. The opposite face of gate 56 seats, when the valve is closed, against an annular lip 68 formed on one side of the auxiliary ring 60. The opposite side of ring 60 has a spherically-curved annular surface which slidably seats against a correspondingly curved surface around the ring 61. The ring 61 thereby supports the auxiliary ring 60 against the gate 56 when the valve is closed, but permits angular adjustment of ring 60 to fit its lip 68 accurately against the gate 56, while the pin 57 and shoulder 58 allow the gate 56 to pivot into accurate seating relation with the lip 67 of ring 62. In order to hold ring 60 to ring 61 when the gate 56 is raised, a pair of inwardly-extending stud pins 69 are mounted on opposite sides of ring 61 with their projecting ends passing through openings in ring 60, the said openings being larger than the stud pins so that ring 60 is free to move sufficiently relative to ring 61 during seating of the gate 56. The three rings 60–62 have the same inner and outer diameters, and when the gate 56 is entirely raised the openings through rings 60–62 permit free and unobstructed flow between ports 52 and 53. When gate 56 is closed it wedges into sealed relation with the lips 68 and 67 of rings 60 and 62, with the result that flow in either direction between ports 52 and 53 is entirely blocked. When the valve seating assembly is to be removed bonnet 54 is removed, thereby releasing tongue 65 from ring 61. The seating unit 59 and its attached auxiliary seating ring 60 are then shifted as a unit to release ring 62 from the counterbore in body 11, and then the unit 59 and auxiliary ring 60 are removed from valve body 11. The assembly is readily replaced by reversing the disassembly procedure.

The valves of the invention are suitable for high temperatures as well as high pressures. When used at high temperatures the valves are preferably modified to substitute screw thread connections for the illustrated O-ring connections, since the O-rings are apt to deteriorate at high temperatures. This change does not affect the above-described principles of operation of valves embodying the invention.

While I have illustrated and described present preferred embodiments of the invention, it will be recognized that the invention is not limited thereto but may be otherwise variously embodied and practiced within the scope of the following claims.

I claim:

1. A valve comprising a valve body having a fluid passageway therethrough, a movable valve gate having opposite faces which are inclined at an angle to each other and which seat when the valve is in closed position, and a structure for seating the valve gate, said structure being removably mounted in the valve body and comprising spaced metal members which receive the valve gate between them and which are wedged apart as the valve gate moves into seated position, said valve body having a bore surrounding said fluid passageway and one of said metal members being in the form of a ring slidably mounted in said bore, and metal means connected to and extending integrally between said members and adapted to flex resiliently to allow relative lateral and tilting movement of said memebrs in response to the wedging action of the closing valve gate on said members.

2. A valve comprising a valve body having a fluid passageway therethrough, a movable valve gate having opposed faces which are inclined at an angle to each other and which seat when the valve is in closed position, and a structure for seating the valve gate, said structure being removably mounted in the valve body and comprising spaced metal members which receive the valve gate between them and which are wedged apart as the valve gate moves into seated position, and metal means connected to and extending integrally between said members and adapted to oppose the separating action of the closing valve gate on said members, said valve body having a bore surrounding said fluid passageway and having a removable bonnet with a tongue extending therefrom into the fluid passageway, at least one of said metal members being in the form of a ring mounted in said bore, and the other of said metal members being in supported engagement with said bonnet tongue.

3. A valve comprising a valve body having a fluid passageway therethrough, a movable valve gate having opposed faces which are inclined at an angle to each other and which seat when the valve is in closed position, and a structure for seating the valve gate, said structure being removably mounted in the valve body and comprising spaced members which seat the valve gate between them and which are subjected to wedging action as the valve gate moves into seated position, and means connecting said members and adapted to oppose the wedging action of the closing valve gate on said members while permitting adjustment of said members to the seated valve gate, said valve body having a bore surrounding said fluid passageway, a bearing surface adjacent the fluid passageway, and a removable bonnet with a tongue extending therefrom into the fluid passageway, one of said metal members being in the form of a ring slidably mounted in said bore, and the other of said metal members being in supported engagement with said tongue and being surface.

4. A valve comprising a valve body having a fluid passageway therethrough, a movable valve element having opposite faces which are inclined at an angle to each other and which seat when the valve is in closed position, and a structure for seating the valve element, said structure being removably mounted in the valve body and comprising spaced metal members which receive the valve element between them and which are wedged apart by the valve element as it moves into seated position, and a pair of metal connecting arms extending integrally between said members and adapted to resiliently oppose the wedging action of the closing valve element on said members, said arms being disposed on opposite sides of said members and adapted to flex so that said members may move laterally and tilt relative to each other as the valve gate seats between them.

5. A valve comprising a valve body having a fluid passageway therethrough, a movable substantially ring-shaped valve gate with opposite faces which are inclined at an angle to each other and which seat when the valve is in closed position, and a structure for seating the valve gate, said structure being movably mounted in the valve body and comprising spaced metal members which receive the valve gate between them and which are wedged apart as the valve gate moves into seated position, and metal means connected to and extending integrally between said members and adapted to flex resiliently to allow relative movement of said members in response to the wedging action of the closing valve gate on said members, one of said members being in the form of a ring and the other said members being in the form of a disk, said valve body having a bore surrounding said fluid passageway and slidably receiving a portion of said ring member, and means sealing the connection between said ring-shaped member and said bore.

6. A valve comprising a valve body having a straight fluid passageway therethrough, a movable valve gate in the form of a solid plate having opposite faces which are inclined at an angle to each other and which seat when the valve is in closed position, and a structure for seating the valve gate, said structure being removably mounted in the valve body and comprising a pair of laterally-spaced rings which are mounted in the valve body surrounding the fluid passageway and which are wedged apart as the valve gate moves into seated position, means connected to and extending integrally between said members and adapted to oppose the wedging action of the closing valve gate on said pair of rings, and an additional ring associated with one of said pair of rings and interposed between the latter one ring and the valve gate when the gate is in seated position, said additional ring and its associated ring having interengaging spherical bearing surfaces therebetween to permit adjustment of the said additional ring against the gate.

7. A valve comprising a valve body having a fluid passageway therethrough, a movable valve gate in the form of a ring having opposite faces which are inclined at an angle to each other and which seat when the valve is in closed position, and a structure for seating the valve gate, said structure being removably mounted in the valve body and comprising laterally-spaced metal members, one a ring mounted around the passageway and the other a solid disk which are urged apart as the valve gate moves into seated position, metal means connected to and extending integrally between said members and opposing the separating action of the closing gate on said members, and an additional member interposed between said gate and an adjacent one of said pair of members, said additional member and the adjacent one of said pair of members having interengaging spherical bearing surfaces, and the other of said pair of members and said additional member having surfaces adapted to seat against the respective opposite faces of the gate.

8. A structure for seating an edgewise-movable valve gate, said structure being an integral unit removable from a valve body and comprising a pair of laterally spaced metal members having opposed surfaces for seating a valve between said members, and a pair of outwardly-bowed metal arms connected to and extending integrally between said members on opposite sides thereof and adapted to flex to allow relative movement of said members during seating of a valve gate therebetween.

9. A valve gate seating structure removable from a valve body and comprising a pair of laterally spaced metal members, at least one of which is a ring, and metal means connected to and extending integrally between said pair of members, one of the pair of members having a gate seating surface and the other having an additional member associated therewith, said additional member being disposed between the other two members and having a gate seating surface facing the first-mentioned gate seating surface, and said additional member and its associated member having interengaging spherical bearing surfaces for sliding relative movement therebetween.

10. A valve comprising a valve body having a fluid passageway therethrough, a movable valve element having opposite seating faces which are inclined at an angle to each other to operate as a wedge when the valve element seats, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said connecting means being yieldable to permit relative tilting of said seating members so that they fit closely against the seated valve element.

11. A valve comprising a valve body having a fluid passageway therethrough, a movable valve gate having opposed faces which are inclined at an angle to each other and which seat when the valve is in closed position, and a structure for seating the valve gate, said structure being removably mounted in the valve body and comprising spaced metal members which receive the valve gate between them and which are wedged apart as the valve gate moves into seated position, and metal means connected to and extending integrally between said members and adapted to oppose the separating action of the closing valve gate on said members, said valve body having a bore surrounding said fluid passageway and having a removable bonnet with a tongue extending therefrom into the fluid passageway, and said valve body also having a portion which extends across the fluid passageway and engages the opposite side of the bonnet tongue from that part of the tongue engaging one of the metal members, at least one of said metal members being in the form of a ring mounted in said bore, and the other of said metal members being in supported engagement with said bonnet tongue.

12. A valve comprising a valve body having a straight fluid passageway therethrough, a movable valve gate in the form of a solid plate having opposite faces which are inclined at an angle to each other and which seat when the valve is in closed position, an axially-movable stem mounted on the valve body to operate the valve gate, a pivotal connection between said stem and gate to allow the gate to hinge on an axis substantially normal to the stem axis, and a structure for seating the valve gate, said structure being removably mounted in the valve body and comprising a pair of laterally-spaced rings which are mounted in the valve body surrounding the fluid passageway and which are wedged apart as the valve gate moves into seated position, means connected to and extending integrally between said members and adapted to oppose the wedging action of the closing valve gate on said pair of rings, and an additional ring associated with one of said pair of rings and interposed between the latter one ring and the valve gate when the gate is in seated position, said additional ring and its associated ring having interengaging spherical bearing surfaces therebetween to permit adjustment of the said additional ring against the gate.

13. A valve comprising a valve body having a fluid passageway therethrough, a movable valve gate in the form of a ring having opposite faces which are inclined at an angle to each other and which seat when the valve is in closed position, and a structure for seating the valve gate, said structure being removably mounted in the valve body and comprising laterally-spaced metal members, one a ring mounted around the passageway and the other a solid disk which are urged apart as the valve gate moves into seated position, metal means connected to and extending integrally between said members and opposing the separating action of the closing gate on said members, and an additional member in the form of a solid disk interposed between said gate and an adjacent one of said pair of members, said additional member and the adjacent one of said pair of members having interengaging spherical bearing surfaces, the other of said pair of members and said additional member having surfaces adapted to seat against the respective opposite faces of the gate.

14. A valve comprising a valve body having a fluid passageway therethrough, a movable valve gate in the form of a ring having opposite faces which are inclined at an angle to each other and which seat when the valve is in closed position, an axially-movable stem mounted in the valve body to operate the valve gate, and a pivotal connection between said stem and gate to allow the gate to hinge on an axis substantially normal to the stem axis, and a structure for seating the valve gate, said structure being removably mounted in the valve body and comprising laterally-spaced metal members, one a ring mounted around the passageway and the other a solid disk which are urged apart as the valve gate moves into seated position, metal means connected to and extending integrally between said members and opposing the separating action of the closing gate on said members, and an additional member interposed between said gate and an adjacent one of said pair of members, said additional member and the adjacent one of said pair of members having interengaging spherical bearing surfaces, the other of said pair of members and said additional member having surfaces adapted to seat against the respective opposite faces of the gate.

15. A structure for seating an edgewise-movable valve gate, said structure being an integral unit removable from a valve body and comprising a pair of laterally spaced metal members, and a pair of outwardly-bowed metal arms connected to and extending integrally between said members on opposite sides thereof and adapted to flex to allow relative movement of said members during seating of a valve gate therebetween, one of said members being a ring and the other a solid disk.

16. A valve gate seating structure removable from a valve body and comprising a pair of laterally spaced metal members, one of which is a ring, and metal means connected to and extending integrally between said pair of members, one of the pair of members having a gate seating surface and the other having an additional member associated therewith, said additional member being disposed between the other two members and having a gate seating surface facing the first-mentioned gate seating surface, said additional member and its associated member having interengaging spherical bearing surfaces for sliding relative movement therebetween, and said additional member and its associated member each being a solid disk.

17. A valve gate seating structure removable from a valve body and comprising a pair of laterally spaced ring-shaped metal members, and metal means connected to and extending integrally between said pair of members, one of the pair of members having a gate seating surface and the other having an additional ring-shaped member associated therewith, said additional member being disposed between the other two members and having a gate seating surface facing the first-mentioned gate seating surface, and said additional member and its associated member having interengaging spherical bearing surfaces for sliding relative movement therebetween, said ring-shaped pair of members and additional member being connected substantially co-axially to provide a straight fluid passageway therethrough.

18. A valve comprising a valve body having a fluid passageway therethrough, a movable valve element having opposite seating faces which are inclined at an angle to each other to operate as a wedge when the valve element seats, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said arms being flexible and integrally connected to both of the said seating members, and said connecting means being yieldable through flexing of said arms to permit relative tilting of said seating members so that they fit closely against the seated valve element.

19. A valve comprising a valve body having a fluid passageway therethrough, a movable valve element having opposite seating faces which are inclined at an angle to each other to operate as a wedge when the valve element seats, a valve stem mounted for axial movement in the valve body, a rigid connection between the valve stem and movable valve element, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said connecting means being yieldable to permit relative tilting of said seating members so that they fit closely against the seated valve element.

20. A valve comprising a valve body having a fluid passageway therethrough, a movable valve element having opposite seating faces which are inclined at an angle to each other to operate as a wedge when the valve element seats, an axially-movable stem mounted in the valve body to operate the valve element, a pivotal connection between said stem and valve element to allow the valve element to hinge on an axis substantially normal to the stem axis and to the direction of flow of fluid through the valve body, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said connecting means being yieldable to permit relative tilting of said seating members so that they fit closely against the seated valve element.

21. A valve comprising a valve body havnig a fluid passageway therethrough, a movable valve element having opposite seating faces which are inclined at an angle to each other to operate as a wedge when the valve element seats, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said connecting means being yieldable to permit relative tilting of said seating members so that they fit closely against the seated valve element, the movable valve element and said one of the seating members having openings therethrough forming part of the fluid passageway through the valve when it is open, and the other seating member being solid to prevent such fluid passage therethrough.

22. A valve comprising a valve body having a fluid passageway therethrough, a movable valve element having opposite seating faces which are inclined at an angle to each other to operate as a wedge when the valve element seats, and means for seating the valve element comprising a pair of seating members having opposed faces adapted to seat the inclined opposite faces of the valve element, one of said members being removably inserted in a fixed position in the valve body, and means connecting said pair of members including a pair of arms extending integrally from opposite sides of said one seating member to hold the other member against the wedging action of the valve element as it moves into seated position, said connecting means being yieldable to permit relative tilting of said seating members so that they fit closely against the seated valve element, said movable valve element having a solid area which blocks passage of fluid when the valve is closed, and the said seating members each having a fluid passageway therethrough.

References Cited in the file of this patent

UNITED STATES PATENTS

| | | |
|---|---|---|
| 953,100 | Nelson | Mar. 29, 1910 |
| 1,135,280 | Hamilton | Apr. 13, 1915 |
| 2,688,462 | Barbehenn | Sept. 7, 1954 |
| 2,730,119 | Bredtschneider | Jan. 10, 1956 |